Patented Dec. 6, 1927.

1,651,578

UNITED STATES PATENT OFFICE.

CHARLES BOGIN, OF TERRE HAUTE, INDIANA, ASSIGNOR TO COMMERCIAL SOLVENTS CORPORATION, OF TERRE HAUTE, INDIANA, A CORPORATION OF MARYLAND.

NITROCELLULOSE LACQUER COMPOSITION.

No Drawing.   Application filed June 1, 1925. Serial No. 34,185.

My invention relates to the production of nitrocellulose lacquer compositions and relates more specifically to the formulation of lacquer compositions whereby new and useful high-boiling nitrocellulose solvents may be incorporated in said compositions, and whereby various gums and diluents may be used in combination with nitrocellulose solutions.

As is well known, a simple solution of nitrocellulose in a solvent mixture does not constitute a satisfactory lacquer for brush or spray application, as a film thus produced is too taut and wrinkled to serve as a satisfactory surface. To increase the body of the lacquer—i. e.—the solid material actually forming the permanent film—without increasing the viscosity of the solution beyond a point where brush or spray application is possible—it is customary to incorporate varying proportions of varnish gums in the lacquer. Suitable gums for this purpose include natural resins such as kauri, elemi, shellac and dammar, and also include certain synthetic resins. The addition of these gums improves the adherence of the film and reduces the penetrability of the film to water. In proper admixture these gums also improve the durability of nitrocellulose lacquers.

The admixture of gums with nitrocellulose solutions is a difficult matter, for the reason that these materials are best dissolved in alcohols or hydrocarbons, whereas nitrocellulose is most soluble in organic ester solvents. Frequently in compounding gum solutions, and nitrocellulose solutions, problems of incompatibility of solutions arise and either the nitrocellulose or the gum is precipitated.

In the case of pigmented lacquers, the nitrocellulose-gum-solvent mixture is incorporated with suitable pigments, ordinarily by grinding the pigment and solution in a ball mill.

Solvents employed in compounding nitrocellulose lacquers include various organic liquids, some of which dissolve nitrocellulose, some of which dissolve gums, and some of which dissolve both nitrocellulose and gums. Lacquer solvents are ordinarily divided into four classes, in accordance with their boiling point or volatility, as follows.

| | Nitrocellulose solvents | Gum solvents and diluents. |
|---|---|---|
| Low boilers (boiling below 100° C.). | Ethyl acetate | Ethyl alcohol. Benzol. |
| High boilers (boiling between 100° and 140° C.). | Butyl acetate Amyl acetate Diethyl carbonate | Butanol. Toluol. |
| Super-high boilers (boiling between 140° and 180° C.). | Diacetone alcohol Ethyl lactate | Xylol |
| Plasticizers boiling point above 300° C. | Butyl phthalate Tricresyl phosphate | |

In compounding a nitrocellulose lacquer, some of the nitrocellulose solvents listed above are obviously necessary. If gums are to be incorporated in the mixture a gum solvent is necessary. In cases in which synthetic resins soluble in nitrocellulose solvents are employed, it is of course not necessary to employ special gum solvents, but even in such cases the materials ordinarily employed as gum solvents—i. e.—hydrocarbons and alcohols—are ordinarily employed as diluents to reduce the viscosity and to adjust the volatility of the lacquer.

On account of the fact that gum solvents ordinarily do not dissolve nitrocellulose, and vice versa, great care must be taken in compounding a lacquer to adjust the relative proportions of these materials so that an even rate of evaporation is attained during the drying of the film. If this is not done, and an excess of nitrocellulose solvent remains on the surface when the last traces of gum solvent are evaporating, the gum is coagulated or precipitated and a "fogged" or "blushed" film results. The reverse is also true—i. e.—if gum solvents (hydrocarbons or alcohols) remain in the film as the last traces of nitrocellulose solvents evaporate, the nitrocellulose is coagulated or "gelled" and a "blushed" film is produced.

I have discovered that hexahydrophenol has certain physical and chemical properties which make it peculiarly valuable in the formulation of nitrocellulose lacquers, as will be later described. Hexahydrophenol is a water-white, oily fluid boiling at 160–161° C. It is miscible with common organic solvents and slightly soluble in water. Its specific gravity is about 0.9471.

Hexahydrophenol, in contact with nitrocellulose, has a peculiar action thereon. Unlike organic esters, it does not dissolve nitrocellulose. Unlike liquid hydrocarbons or aliphatic alcohols—i. e. the diluents mentioned above—hexahydrophenol is not entirely free from solvent action on nitrocellulose. Hexahydrophenol has a semi-solvent action on nitrocellulose, causing the latter material to swell up but never actually dissolving it. It is my belief that hexahydrophenol, is from its chemical structure, capable of exerting a certain solvent action on nitrocellulose but that certain other properties of the material prevent its acting as a complete solvent.

I have found that in the formulation of lacquers, the employment of hexahydrophenol, allows the achievement of new and valuable results, and improved lacquer compositions are thus effected.

In the past, the use of super-highboiling nitrocellulose solvents, such as were mentioned above, in the compounding of lacquers containing gums or resins, has been fraught with difficulty and in some cases impossible of achievement.

The gums or resins ordinarily employed in lacquers may be divided into two general classes in accordance with their ease of solubility in organic materials. Generally these gums are insoluble or only partially soluble in organic esters. Shellac, kauri, mastic, congo and certain synthetic gums such as metallic salts of alkyl half esters are classifiable as alcohol-soluble—i. e. they completely dissolve in such solvents as methyl, ethyl, propyl, butyl, and amyl alcohols. Certain other gums such as dammar, and elemi, and certain synthetic gums such as ester gum are classifiable as hydrocarbon-soluble—i. e. they dissolve in benzol, toluol, xylol, and similar substances.

I have discovered that the addition of a small amount of hexahydrophenol to a nitrocellulose lacquer will permit the blending of nitrocellulose solutions with otherwise incompatible gum solutions.

For example when super-highboiling nitrocellulose solvents such as diacetone alcohol were employed, in the past it has been impossible to introduce considerable quantities of gums, particularly the hydrocarbon-soluble gums into the lacquer without producing a "gum blush" for reasons previously explained. The addition of a small quantity of hexahydrophenol to such a lacquer prevents such trouble and allows the formation of a desirable lacquer film.

For example, by virtue of the use of hexahydrophenol it is possible to employ large quantities of gums in the presence of diacetone alcohol solutions of nitrocellulose, as indicated in the following formula:—16 ounces nitrocellulose ("½ or 4 second cotton") 16 ounces gum ("hydrocarbon soluble" viz dammar, ester, etc.) dissolved in one gallon of the following solvent mixture: 10% diacetone alcohol, 10% hexahydrophenol, 30% ethyl acetate, 25% benzol, 25% toluol.

The lacquer formula above indicated is typical of an improved mixture containing hexahydrophenol, the presence of which allows the use of super-highboiling nitrocellulose solvents. For the diacetone alcohol there could be substituted various other "super-highboilers" such as ethyl, propyl, or butyl lacetate, butyl propionate and other nitrocellulose solvents boiling above 140° C. While ethyl acetate is the low-boiling nitrocellulose solvent used in the above formula it is obvious that other low-boiling nitrocellulose solvents, of which there are many in the art, might be substituted for it. Obviously pigments or plasticizers could be added to this formula.

Where alcohol-soluble gums are employed, as for example shellac, it is necessary to introduce the gum in the lacquer composition by first dissolving it in butanol. In such cases the typical formula given above would be modified as follows:

16 ounces nitrocellulose ("½ or 4 second cotton"), 8 ounces dammar gum, 8 ounces shellac, dissolved in one gallon of a solvent mixture comprising: 10% diacetone alcohol, 10% hexalin, 10% butanol, 20% ethyl acetate, 25% benzol, 25% toluol.

Another advantage accruing from the use of hexahydrophenol lies in the fact that while in general there is a certain limit of tolerance of a nitrocellulose solution for miscible non-solvent material, hexahydrophenol does not limit the tolerance of nitrocellulose solutions for diluents such as hydrocarbons or aliphatic alcohols.

I am aware of the fact that hexahydrophenol has been proposed for use as a "gelatinizer" for nitrocellulose, particularly in the explosive industry, but my invention does not contemplate such a use. I am also aware of the fact that hexahydrophenol has been proposed for use as a diluent—i. e. to replace a liquid hydrocarbon non-solvent—in nitrocellulose lacquer compositions and I do not claim such broad use.

As was disclosed above, my discovery and invention relates to the use of hexahydrophenol as a blending agent for the incorporation of gums in nitrocellulose lacquer compositions whereby otherwise incompatible materials are rendered compatible.

Now, having fully described my invention I claim the following as new and novel:—

1. A lacquer composition comprising nitrocellulose, varnish gums, a nitrocellulose solvent boiling between 140–180° C., hexahydrophenol, ethyl acetate, an aliphatic alcohol, and a mixture of the lower members of the benzene series of hydrocarbons.

2. A lacquer composition consisting of one-half to one pound of nitrocellulose and one-half to one pound of varnish gum, dissolved in one gallon of a solvent mixture comprising 10% of a nitrocellulose solvent boiling between 140–180° C., 10% hexahydrophenol, 30% ethyl acetate, and 50% of a mixture of lower members of the benzene series of hydrocarbons.

3. A lacquer composition consisting of one half to one pound nitrocellulose and one half to one pound of varnish gum dissolved in one gallon of a solvent mixture comprising 10% diacetone alcohol, 10% hexahydrophenol, 30% ethyl acetate, 25% benzol, and 25% toluol.

4. In the process of compounding a lacquer which comprises a solution of nitrocellulose containing a solvent boiling between 140–180° C. and solution of gum in a mixture of the lower members of the benzene series of hydrocarbons and an aliphatic alcohol, the said gum solution being normally incompatible with the nitrocellulose solution, the step which consists in adding hexahydrophenol to produce compatibility.

5. In the process of compounding a lacquer which comprises a solution of nitrocellulose containing a solvent boiling between 140–180° C. and a solution of gum in a mixture of the lower members of the benzene series of hydrocarbons, the said gum solution being normally incompatible with the nitrocellulose solution, the step which consists in adding hexahydrophenol to produce compatibility.

In testimony whereof I affix my signature.

CHARLES BOGIN.